US 6,563,699 B1

United States Patent
Choi

(12) United States Patent
Choi

(10) Patent No.: US 6,563,699 B1
(45) Date of Patent: May 13, 2003

(54) PORTABLE COMPUTER HAVING LOCKING APPARATUS

(75) Inventor: Phil-Kyu Choi, Kyunggi-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/522,843

(22) Filed: Mar. 10, 2000

(30) Foreign Application Priority Data

Mar. 13, 1999 (KR) .............................. 99 8506

(51) Int. Cl.⁷ ................................. G06F 1/16
(52) U.S. Cl. ................... 361/683; 361/679; 361/686
(58) Field of Search ................... 361/679–686

(56) References Cited

U.S. PATENT DOCUMENTS 4,984,833 A * 1/1991 Knürr .......................... 292/96
6,115,239 A * 9/2000 Kim .......................... 361/681
6,122,152 A * 9/2000 Goto et al. .................... 361/1
6,256,194 B1 * 7/2001 Choi et al. .................. 361/683

* cited by examiner

*Primary Examiner*—Darren Schuberg
*Assistant Examiner*—Yean-Hsi Chang
(74) *Attorney, Agent, or Firm*—Robert E. Bushnell, Esq.

(57) ABSTRACT

A portable computer of this invention includes a locking mechanism capable of inserting a lug into a display panel when the display panel is opened from a base. The locking mechanism comprises a pocket, a slider, and a knob. The pocket is formed in the display panel, and has both sides extended from a face of the display panel and a side connecting the both sides. The slider is located in the pocket to be movable in a straight-line motion between the both sides of the pocket, and is formed to make the lug inserted into an inside. The knob is inserted from the face of the display panel to be coupled to the slider, and operates the slider to protrude the lug from the slider toward a front of the display panel.

24 Claims, 7 Drawing Sheets

PORTABLE COMPUTER HAVING LOCKING APPARATUS

CLAIM OF PRIORITY

This application makes reference to, incorporates the same herein, and claims all benefits accruing under 35 U.S.C. §119 from my application PORTABLE COMPUTER HAVING LOCKING APPARATUS filed with the Korean Industrial Property Office on Mar. 13, 1999 and there duly assigned Serial No. 8506/1999.

BACKGROUND OF THE INVENTION

1. Field of the Invention

The present invention relates to a portable computer and, more particularly to, a portable computer having a locking mechanism for locking a display panel to a base.

2. Description of the Related Art

Portable computers have recently become popular, principally due to portability and convenience. Portable computer makers provide a variety of auxiliary apparatus so that users may more freely use portable computers in an effort for satisfying requirement of the users. Typically, a portable computer uses a locking lug to lock the display onto the base when the computer is not in use. When the display is unlocked from the base, the lug protrudes from the display panel. In this unlocked position, the exposed lug is unattractive and subject to damage as it protrudes outwardly from the display panel when not in use. I have not seen a portable computer where the lug of the display panel is not exposed when the display panel is opened from the base.

SUMMARY OF THE INVENTION

It is therefore an object of the present invention to provide an improved portable computer.

It is another object to provide a portable computer with a locking mechanism having a lug that does not protrude outwardly when a display panel is unlocked from a base.

These and other objects may be attained with a portable computer constructed with a base, a display panel, and a locking mechanism. A seat is formed on a top surface of the base. The display panel has a front and a rear, and covers the top surface of the base by the front of the display panel. The locking mechanism is installed in the display panel, and secures the display panel to the base by means of a lug coupled to the seat. The locking mechanism may be constructed with a pocket formed in the display panel and with opposite sides of the locking mechanism extending from the top surface of the display panel connected together with an intermediate side connecting the both sides. A slider located in the pocket moves with a straightline motion between the opposite sides of the pocket and is formed to accommodate insertion of the lug. A knob may be inserted from the top surface of the display panel and coupled to the slider, to force the lug to protrude from the front of the display panel when the user uses the knob to move.

A portable computer equipped with this locking mechanism may insert the lug into an inside of the display panel. In this invention, the slider has an opening formed forward the front of the display panel. The knob is coupled to the slider across the opening. One end of the lug is inserted into the opening to be rotatably coupled to the knob. The locking mechanism may further comprise a first protrusion formed in the slider; and a hole, which is formed in the lug, coupled to the first protrusion when the lug is protruded from the slider. Owing to such a first protrusion and a hole, a portable computer of this invention may prevent automatic rotation of the lug when the lug is protruded from the slider.

The locking mechanism may also be constructed with a stopper formed on a bottom surface of the pocket, in front of the lug in the direction of motion of the slider for protruding the lug; and a second protrusion formed under the lug, hooked on the stopper when the slider is moved by the knob, and rotated to the slider to make the lug protrude from the slider.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
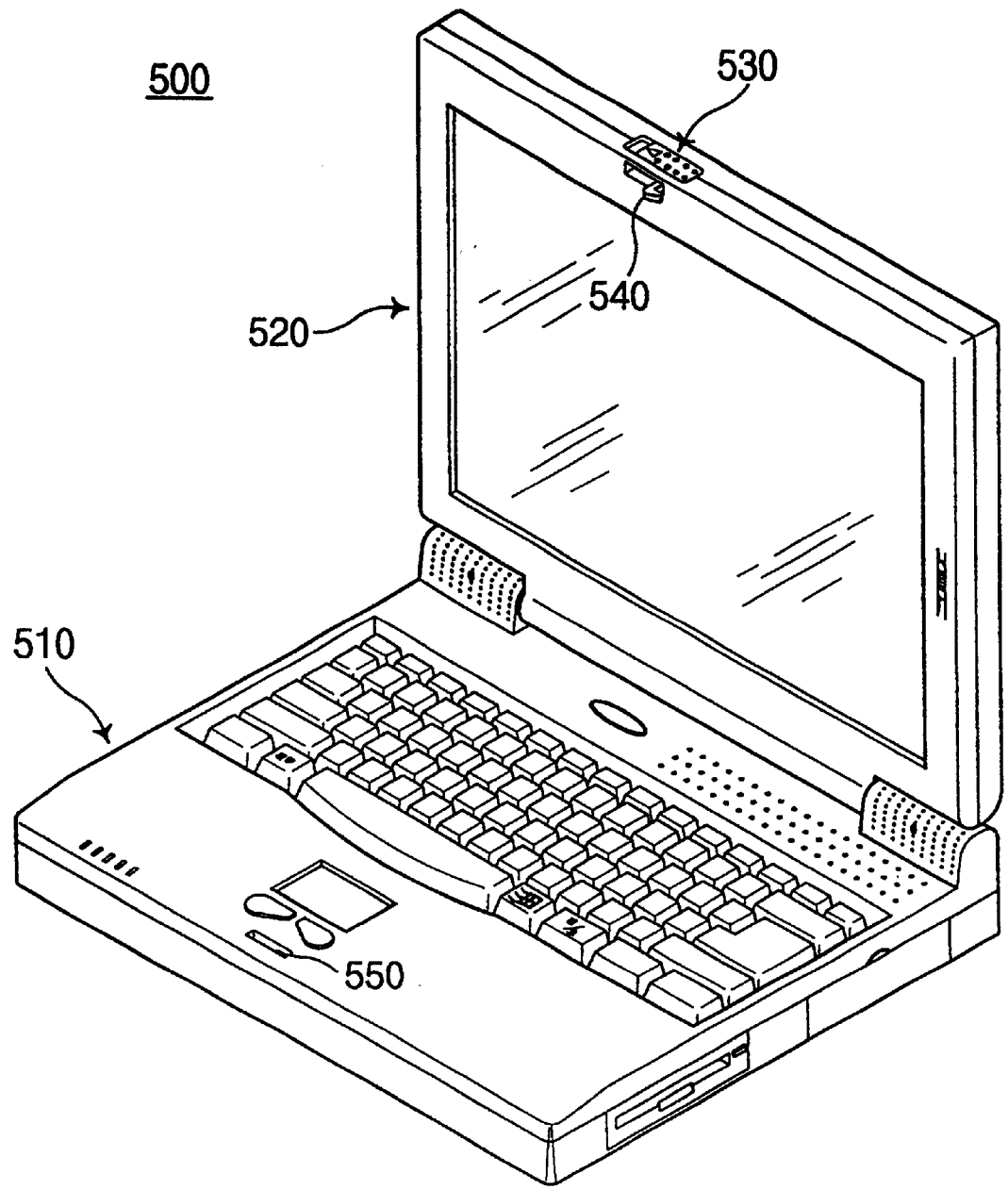
FIG. 1 is a perspective view of a typical portable computer having a locking mechanism.

Turning now to the drawings, FIG. 1 is a perspective view showing a portable computer in which a conventional locking mechanism is installed. Portable computer 500 has a special locking mechanism 530 that prevents inadvertent unlocking of a display panel 520 from a base 510 when the base 510 is covered with the display panel 520. The locking mechanism 530 couples a lug 540 outwardly exposed to a seat 550 formed in the base 510, fixing the display panel 520 to the base 510 thereby. In the computer 500, the lug 540 is formed to be always outwardly protruded. If the lug 540 is damaged, the locking mechanism 530 may not be used. The lug 540 is likely to be damaged because of its protruding structure. Further, the protruding structure makes the lug 540 an unattractive sight to the user.

Figure 2:
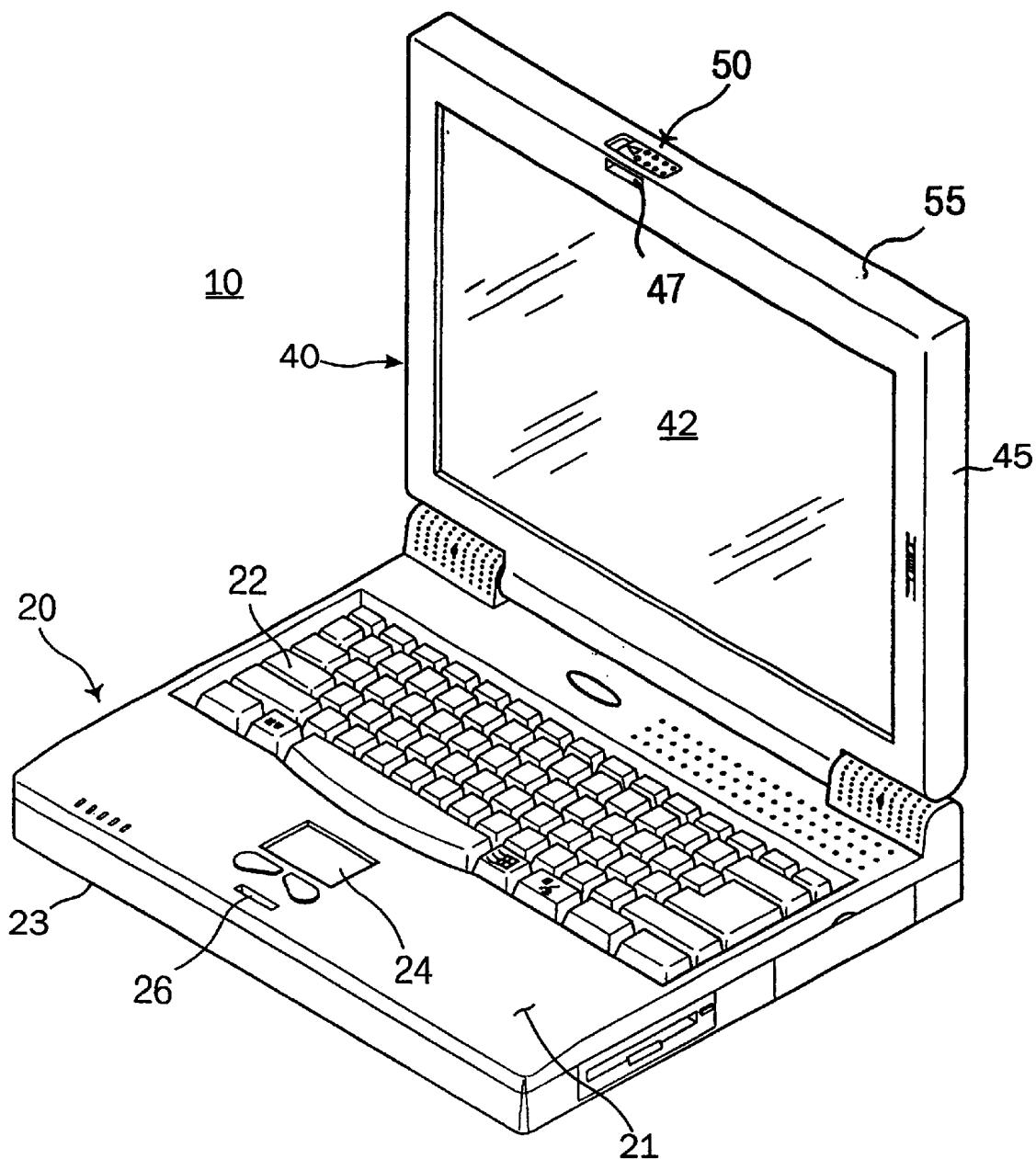
FIG. 2 is a perspective view of a portable computer having a locking mechanism as an embodiment of the present invention.

FIG. 2 is a perspective view of a portable computer constructed with a locking mechanism according to an embodiment of the invention. Portable computer 10 has a base 20 and a display panel 40. The base 20 has a first face (or first major surface or top surface) 21 having a keyboard assy 22, touch pad 24, the first major surface is perforated by a first hole (or seat) 26. Base 20 also has a bottom surface 23 opposite first face 21, bottom surface 23 of base 20 is not perforated by any holes. The base 20 may receive a variety of electric elements such as a keyboard assembly 22, a central processing unit (CPU), a power supply device (e.g., a battery), and storage devices (e.g., a hard disk and a floppy disk). Here, the keyboard assembly 22 has at least one printed circuit board with a plurality of key switches and a matrix are electrically or optically connected to base 20. The electric elements further has a pointing device such as a touch pad 24 for controlling a pointer on a display 42 of the display panel 40. The electric elements are located in the base 20, or are located so that they are outwardly exposed the base 20. The display panel 40 is pivotally coupled to the base 20 in the back of the base 20 through a certain shape of a hinge structure. Covering a top surface of the base 20, the display panel 40 serves as a cover to protect key elements of a keyboard exposed on the top surface thereof. When the display panel 40 is opened, it serves as a holder to receive a display 42. The display 42, which is located on the front of the display panel 40, may be a display device such as a video monitor or a liquid crystal display (LCD).

A special locking mechanism 50 is provided with the portable computer 10 so that the display panel 40 may not be inadvertently opened from the base 20 when the display panel 40 covers the base 20. A lug is coupled to first hole 26 formed in the base 20, fixing the display panel 40 to the base 20 by means of the locking mechanism 50. In such a portable computer 10, the lug of the locking mechanism 50 is inserted into the display panel 40 so that the lug may not protrude outwardly when the display panel 40 is opened from the base 20.

Figure 3:
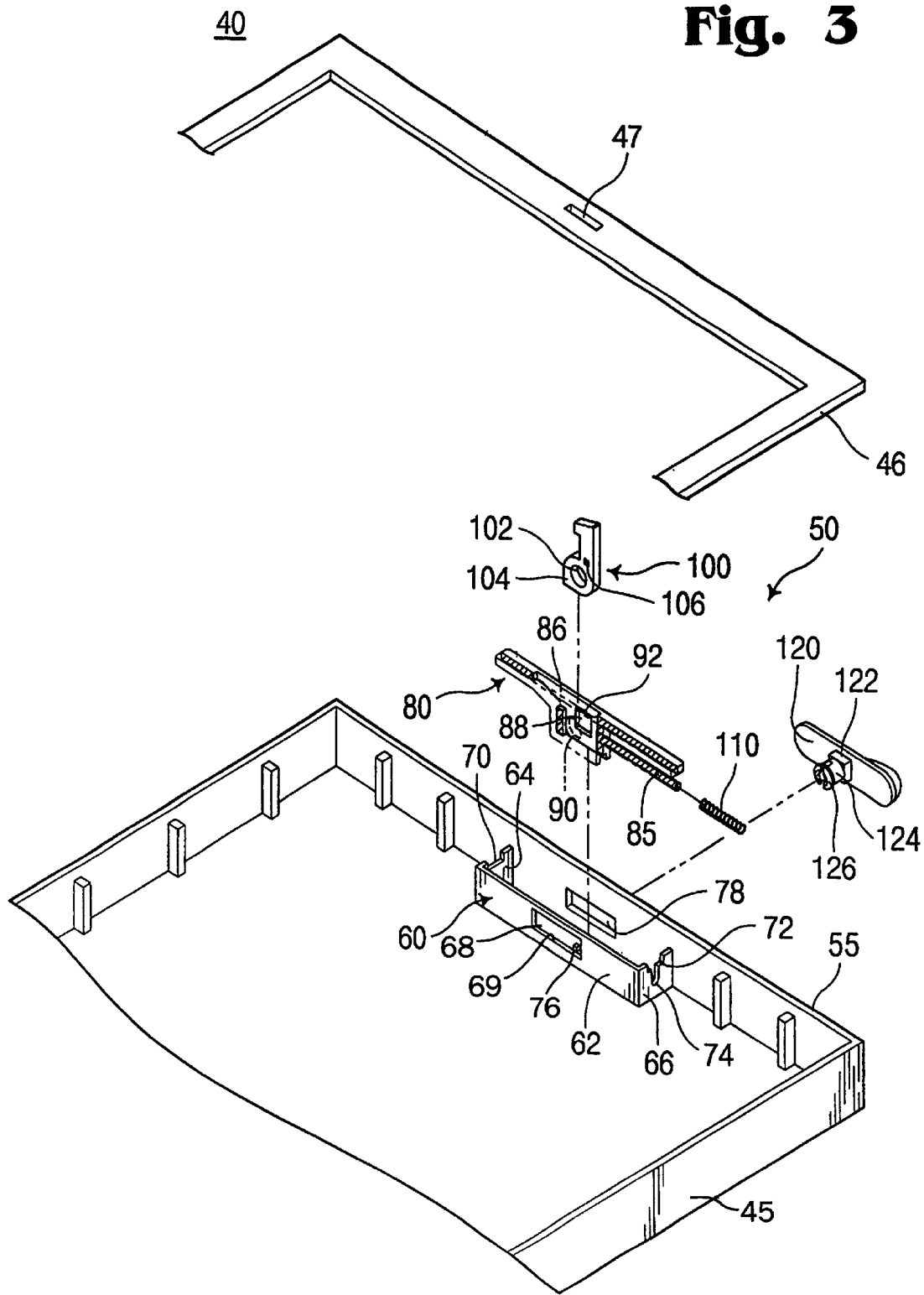
FIG. 3 is an exploded perspective view of a locking mechanism constructed as an embodiment of the invention.
Figure 4:
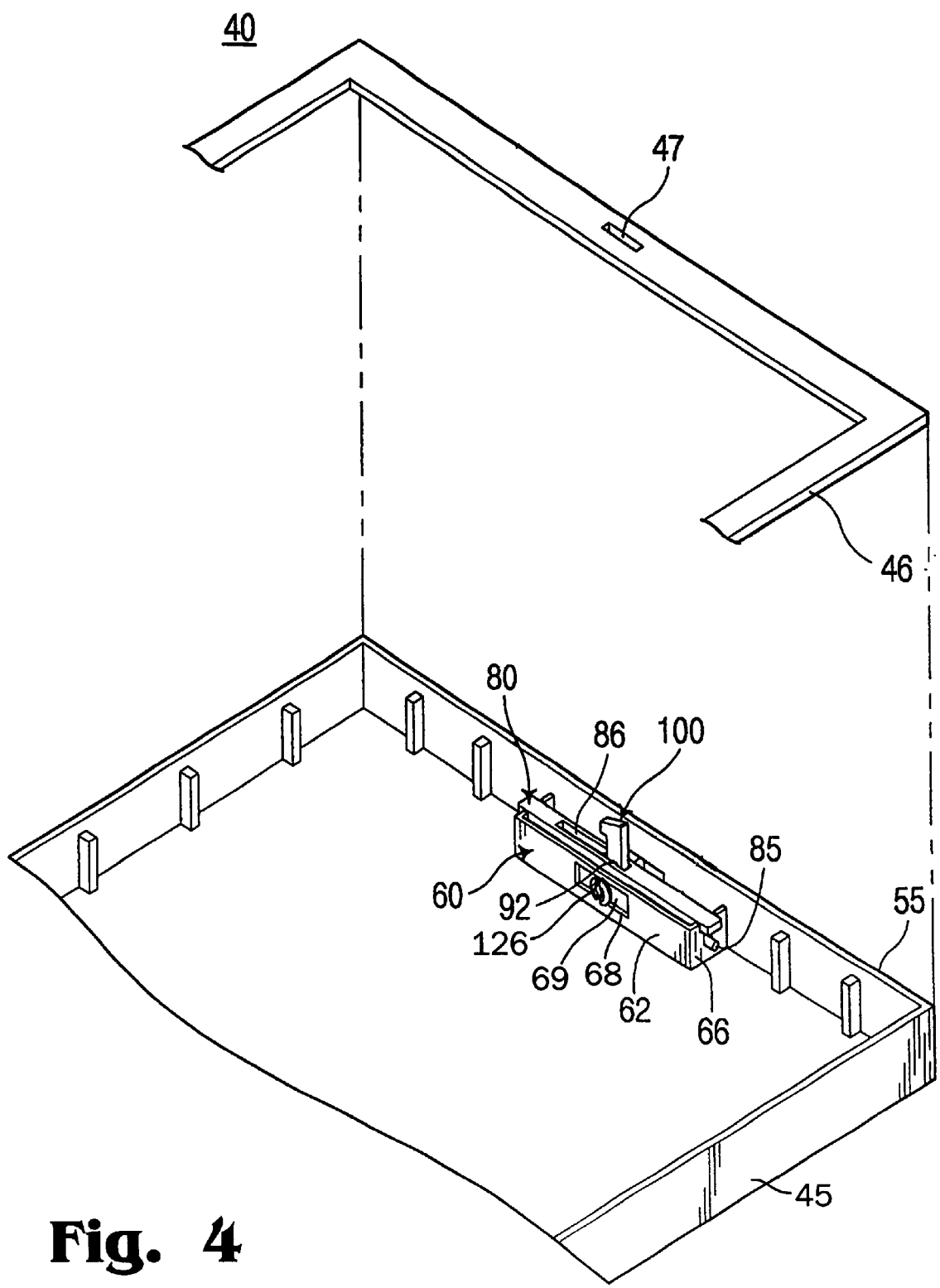
FIG. 4 is an assembly view of the embodiment shown in FIG. 3.

FIGS. 3–6 illustrate the preferred embodiment of such a locking mechanism 50. Referring now to FIG. 3, a locking mechanism 50 according to the preferred embodiment is installed in a display panel 40 having a back side 44 and a front side (or front face or second major surface) 46 with edge side (or second face) 45 connecting front side 46 to back side 44 of is display panel 40. A second hole 47 perforates front side 46, where a lug 100 of the locking mechanism 50 can protrude toward a front of the display panel 40. A pocket 60 is formed on back side 44. The pocket 60 has both sides 64 and 66 extending from face 55 of the edge side 45, and an internal space formed by a surface 62 connected therebetween. A slider 80 is located in the pocket 60 so as to be movable in a straight-line motion between the both sides 64 and 66 of the pocket 60. Grooves 70 and 72 corresponding to both ends of a slider 80 are formed in the both sides 64 and 66, respectively. The slider 80 is coupled to a spring 110 for supplying the elastic force to the slider 80 against one side 66 of the pocket 60. For coupling the spring 110 thereto, a rib 85 is formed in the slider 80 and a groove 74 is formed in one side 66 of the pocket 60. At this time, the rib 85 is located in the groove 74.

An opening 86 is formed in the slider 80. The opening 86 is formed toward a front of the display panel 40. One end of the lug 100 is inserted into the opening 86. At this time, over the slider 80, a square hole 88 and a circular hole 90 are formed in both sides of the opening 86, respectively. A knob 120, which is inserted from the face 55 of the edge side 45, is coupled to the square hole 88 and the circular hole 90. In other words, a square part 122 and a circular part 126 having a section corresponding to the square hole 88 and the circular hole 90 are formed in the knob 120. The square part 122 is located in third hole 78 formed on the face 55 of the edge side 45 and the square hole 88 of the slider 80. The circular part 126 is located in the opening 86 of the slider 80 and the hole 68 formed in the connecting surface 62. A hole 102 is coupled to a pivot 124 formed between the square part 122 and the circular part 126, and is formed in one end of the lug 100 located in the opening 86. The lug 100 is revolvably coupled to the knob 120 as lug 100 pivots about pivot 124 of knob 120.

Lug 100 is protruded from the slider 80 by operation of the knob 120. In other words, the lug 100 is protruded toward the front of the display panel 40. When this happens, a protrusion (or stopper) 76 is formed on the bottom surface 69 of the pocket 60. The protrusion 76 hooks the protrusion 104 formed under the lug 100 when the slider 80 is moved by operation of the knob 120. Thus, the lug 100 is moved and revolved by the knob 120 to be protruded outwardly toward the slider 80. The protrusion 92 is formed in one end of the opening 86, and a groove 106 coupled to the protrusion 92 is formed in the lug 100. The protrusion 92 and the groove 106 serve to fix the position of the lug 100 when the lug 100 is protruded from the slider 80.

Figure 5:
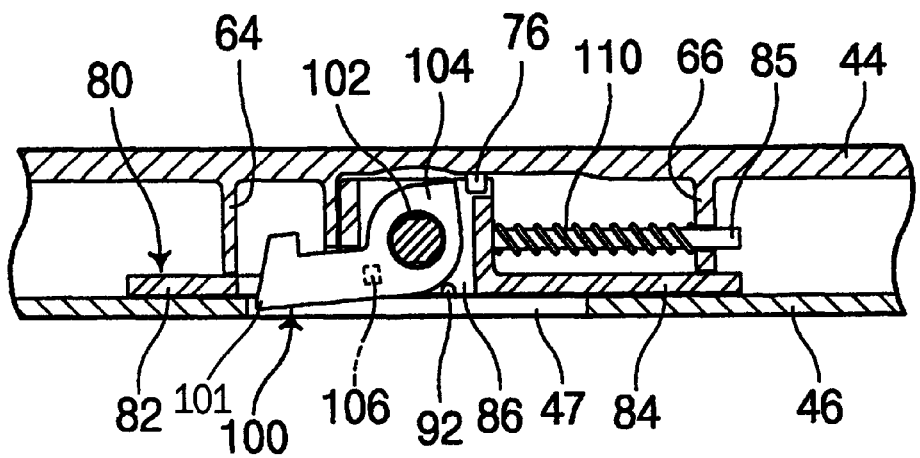
FIG. 5 is a diagram from the direction of the knob, showing a lug inserted into a display panel.
Figure 6:
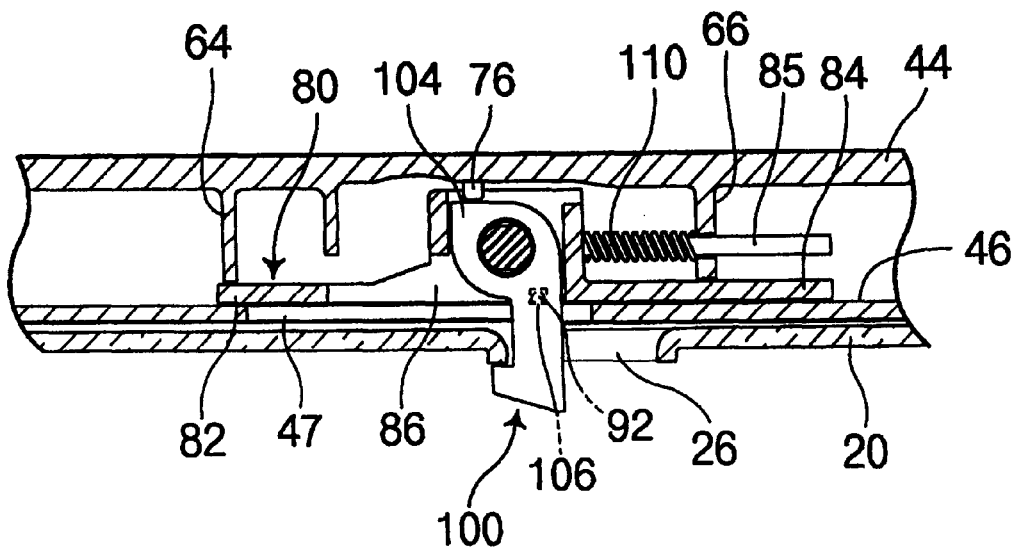
FIG. 6 is a diagram seen from the direction of the knob, showing a lug protruded from the display panel to be coupled to a seat of a base.

FIGS. 5–6 are diagrams for explaining the operation of a locking mechanism according to an embodiment of the invention. Referring now to FIGS. 5–6, when a user presses a lug 100 of a locking mechanism 50 according to an embodiment of the invention, the lug 100 is inserted into a display panel 40. That is, the lug 100 is inserted into the slider 80 to lie in a state shown in FIG. 5. When the user operates the knob 120 in this state, the slider 80 coupled to the knob 120 is moved. At this time, a protrusion 104 of the lug 100 is hooked on a protrusion 76 formed on bottom surface 69 of a pocket 60. Consequently, the lug 100 is revolved with it coupled to the knob 120 and is protruded outwardly toward the display panel 40 from the inside of the slider 80. This prevents inadvertent revolution of the lug 100, if a user does not purposely press the lug 100. When the display panel 40 covers the base 20 under this state, lug 100 is coupled to first hole 26 of the base 20. Receiving elastic force through a spring 110 coupled to the slider 80 with the lug 100 coupled to first hole 26, the lug 100 may be fixed to the base 20.

Figure 7:
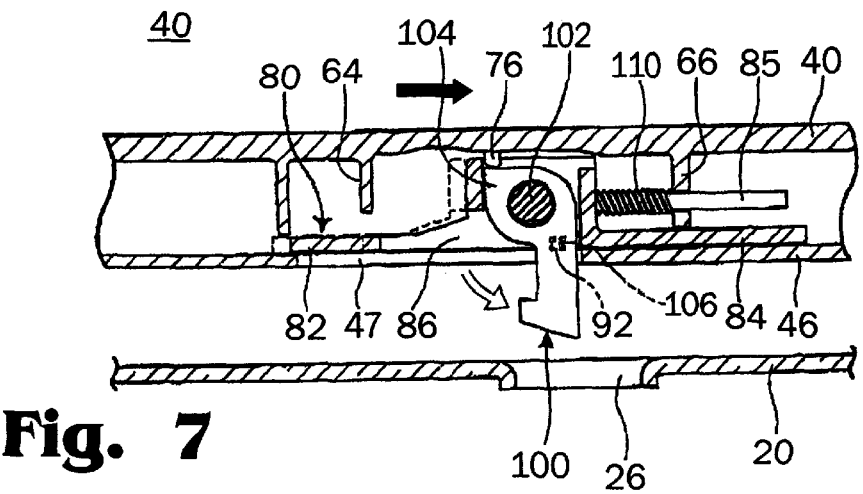
FIGS. 7–9 illustrate how the display panel is closed and locked onto the base of a portable computer according to the embodiments of the present invention.
Figure 8:
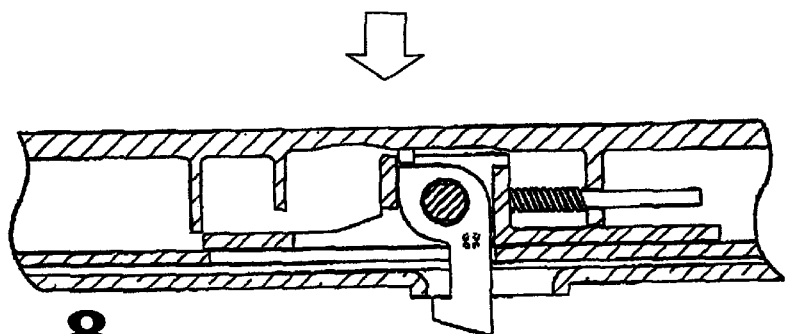
Figure 9:
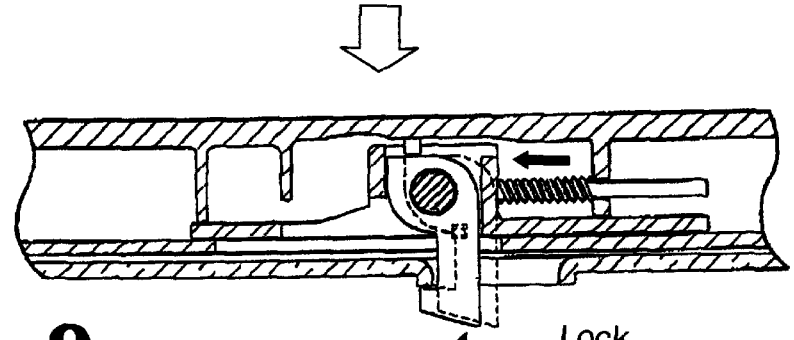
Figure 10:
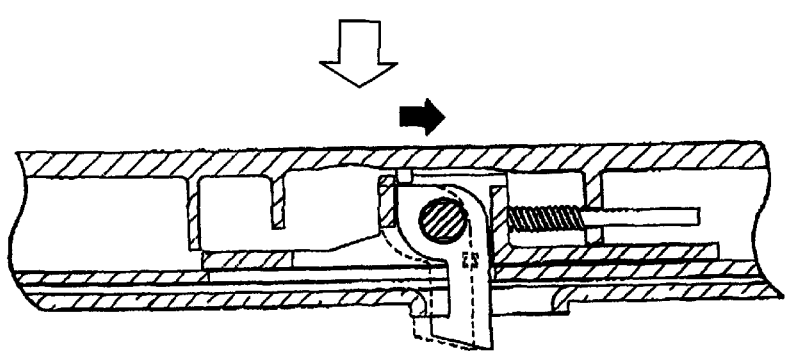
FIGS. 10–13 illustrate how the display panel is opened and unlocked from the base of a portable computer according to the embodiments of the present invention.

FIGS. 5 and 7–10 illustrate the procedure for locking the display panel to the base according to the principles of the present invention. When the display panel is opened from the base, the lug 100 is completely stored within display 40 and slider 80 is positioned with spring bias 110 as illustrated in FIG. 5. To lock the display panel to the base, knob 120 is first slid completely to the right fully against spring bias of the slider 80, as illustrated in FIG. 7. Note that in this position, groove 106 of lug 100 engages with protrusion 92 and protrusion 104 of lug 100 is caught on protrusion 76 and the hook-shaped arm 101 of lug 100 extends through hole 47 on the front side of display panel 46. Then, display panel 40 is closed onto base 20, as illustrated in FIG. 8. Then, knob 120 is slid with spring bias 110 causing hook-shaped arm 101 of lug 100 to lock onto edge of hole 26 in base unit 20 as illustrated in FIG. 9.

Figure 11:
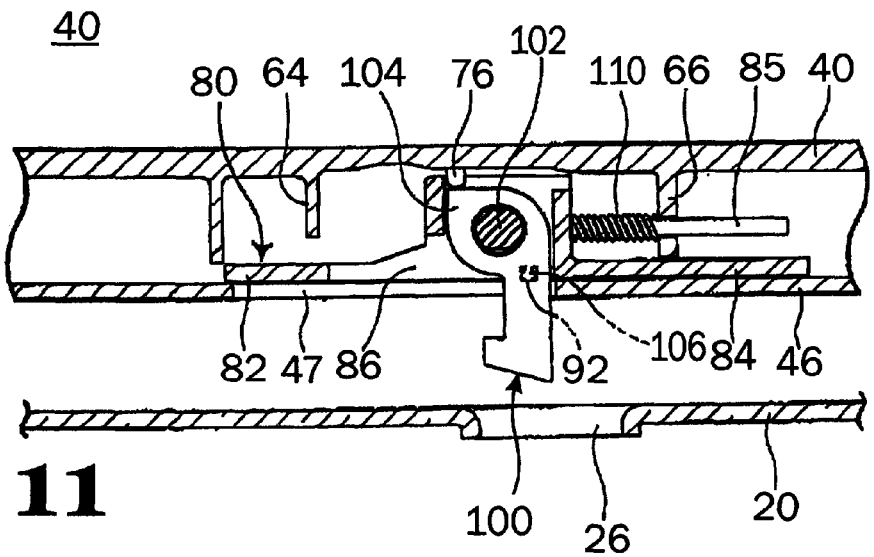
Figure 12:
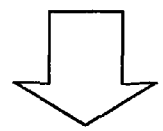
Figure 12:
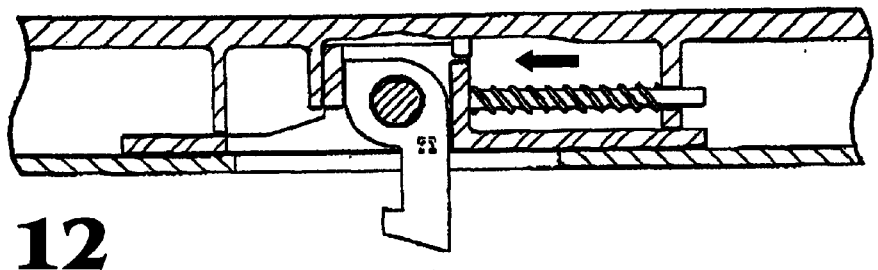
Figure 13:
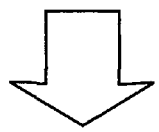
Figure 13:
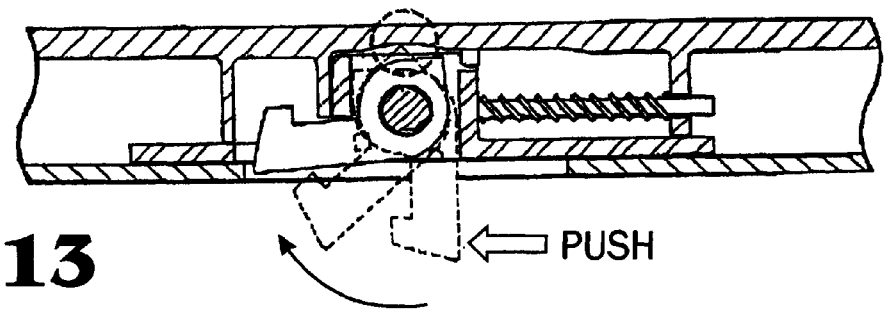

In order to unlock and separate distal end of the display panel 40 from distal end of base 20, it is to be appreciated that lug 100 is positioned as illustrated by the solid lines of FIG. 9. Knob 120 is first moved against spring bias of slider 80 to unhook hook-shaped arm 101 of lug 100 from edge of hole 26 in base unit 20 as illustrated by the solid lines of FIG. 10. Then, the user separates the distal end of display 40 from the distal end of base 20 as illustrated in FIG. 11. Then, the user releases knob 120 allowing slider 80 to move with spring bias 110 in the direction "A" causing protrusion 104 of lug 100 to disengage from protrusion 76 as illustrated in FIG. 12. Then, the user pushes on hook-shaped arm 101 of lug 100 causing groove 106 of lug 100 to be dislodged from protrusion 92 on slider 80 causing lug 100 to rotate to a position so that the entire lug 100, including hook-shaped portion 101 is totally disposed within display panel 40 as illustrated in FIGS. 5 and 13. Cutout portion "B" in display panel 40 in FIG. 13 enables protrusion 104 of lug 100 to rotate.

According to the invention, a lug is not protruded outwardly when a display panel is opened from a base. Thus, the lug cannot be damaged by protruding outward from the display panel when the display panel is separated from the base. Further, the lug is inserted into the display panel when the display panel is opened from the base, maintaining an elegant appearance in a design aspect.

What is claimed is:

1. A portable computer, comprising:
   a base having a seat formed on a first face;
   a display panel having a front and a second face and covering said first face;
   a lug capable of coupling to said seat; and
   a locking mechanism installed in said display panel, retaining said display panel securely against said base by means of said lug, said locking mechanism comprising:
   a pocket installed in said display panel, having two sides extending from said second face and a surface connecting said two sides;
   a slider located in said pocket to move with straight-line motion between said two sides of said pocket and having said lug inserted into an inside; and
   a knob coupled to said slider, for protruding said lug toward said front of said display panel by operation of said slider, so that said locking mechanism inserts said lug into said display panel, said locking mechanism being absent any additional lugs.

2. The portable computer of claim 1, said locking mechanism further comprises:
   a first protrusion formed in said slider; and
   a groove formed in said lug, coupled to said first protrusion when said lug is protruded from said slider, so that said lug is not optionally revolved when said lug is protruded from said slider.

3. The portable computer of claim 1, wherein said lug comprises only one hook-shaped arm extends from a pivot of said lug.

4. The portable computer of claim 1, further comprised of said slider having an opening formed toward said front of said display panel, said knob is coupled to said slider across said opening, and one end of said lug is inserted into said opening to be revolvably coupled to said knob.

5. The portable computer of claim 1, with said locking mechanism further comprising:
   a stopper formed on a bottom surface of said pocket to be located toward motion of said slider and in front of said lug; and
   a second protrusion formed under said lug and hooked on said stopper when said slider is moved by said knob, for ejecting said lug from said slider by revolving said lug to said slider.

6. A portable computer, comprising:
   a base having a first major surface having a keyboard, said base also having a first hole displaced from said keyboard and located in said first major surface;
   a display panel pivotally connected to said base, said display panel having a second major surface having a display and having a second hole displaced from said display, said second hole located in said second major surface, said second hole mates with said first hole when said display panel is closed onto said base and said second major surface is in contact with said first major surface, said display panel being absent of a lug protruding from said second hole when said display panel is rotated open and said first major surface is separated from said second major surface; and
   a locking mechanism, located in close proximity with said second hole, said locking mechanism comprising said lug fixing said display panel to said base when said first major surface is in contact with said second major surface, said locking mechanism being absent any additional lugs.

7. The portable computer of claim 6, said display panel being perforated by a third hole accommodating a knob that allows a user to store said lug completely within said display panel or project said lug from said second hole by user manipulation of said knob.

8. The portable computer of claim 7, said locking mechanism further comprises a pocket having two sides, said pocket disposed within said display panel in close proximity with said second hole.

9. The portable computer of claim 8, said locking mechanism further comprising a slider disposed in said pocket movable in straight-line motion between said two sides of said pocket and formed to allow said lug to completely reside within said display panel of said portable computer.

10. The portable computer of claim 9, said locking mechanism further comprising:
    a first protrusion formed in said slider; and
    a groove, which is formed in said lug, coupled to said first protrusion when said lug is protruded from said slider, so that said lug is not optionally revolved when said lug is protruded from said slider.

11. The portable computer of claim 6, said lug comprising only one hook-shaped arm extending from a pivot of said lug.

12. The portable computer of claim 9, said slider has an opening formed toward a front of said display panel, said knob is coupled to said slider across said opening, and one end of said lug is inserted into said opening to be revolvably coupled to said knob.

13. The portable computer of claim 9, with said locking mechanism further comprising,
    a stopper formed on a bottom surface of said pocket to be located toward motion of said slider and in front of said lug; and
    a second protrusion formed under said lug and hooked on said stopper when said slider is moved by said knob, for ejecting said lug from said slider by revolving said lug to said slider.

14. A portable computer, comprising:
    a base having a top surface and a bottom surface, said top surface having a keyboard disposed thereon, said top surface of said base being perforated by a first hole displaced from said keyboard;
    a display panel pivotally connected to said base, said display panel having a front side and a back side opposite to said front side, said display panel having an edge side joining said front side to said back side, a display being located on said front side, said front side being perforated by a second hole displaced from said display, said second hole mating with said first hole of said base when said display panel is rotated so that said front side of said display panel is in contact with said top surface of said base; and a locking mechanism disposed in said display panel between said front side and said back side, said locking mechanism being located in the vicinity of said second hole, said locking mechanism comprising:
  a single lug being rotatable about a pivot, said lug having only one hook-shaped arm extending radially outward from said pivot;
  a slider attached to said lug controlling an operation of said lug, said slider being spring loaded; and
  a knob attached to said slider allowing user operation of only said lug, said knob being located on said edge side of said display panel in the vicinity of said second hole, wherein said spring is biased so that said lug, including said hook-shaped arm, is entirely located between said front side and said back side of said display panel absent user manipulation of said knob, said locking mechanism being absent any additional lugs.

15. The portable computer of claim 14, wherein user manipulation of said knob causes said slider to move against said spring bias, causing said lug to rotate, causing said hook-shaped arm of said lug to protrude from said second hole.

16. The portable computer of claim 15, said display panel is locked onto said base by a method comprising the steps of:
  providing said front side of said display panel is rotated apart from said top surface of said base;
  sliding said knob from a first position to a second position, causing said hook-shaped arm of said lug to protrude from said second hole;
  rotating said display panel relative to said base until said front side of said display panel makes contact with said top surface of said base while holding said knob in said second position, allowing said hook-shaped arm of said lug to be inserted into said first hole; and
  releasing said knob, allowing said knob to return to said first position, causing said hook-shaped arm of said lug to latch onto an edge of said first hole.

17. The portable computer of claim 15, said display panel is unlocked from said base by a method comprising the steps of:
  providing said portable computer wherein said front side of said display unit is in contact with said top surface of said base and said hook-shaped arm of said lug is locked into an edge of said first hole of said top surface of said base;
  moving said knob from a first position to a second position, causing said hook-shaped arm of said lug to become detached from said edge of said first hole;
  rotating apart said display panel from said base while said knob is held in said second position with said hook-shaped arm of said lug protruding from said second hole; and
  releasing said knob causing said knob to move to said first position, causing said lug to rotate so that said hook-shaped arm of said lug rotates into said second hole and remains entirely stored between said front side and said back side of said display panel.

18. The portable computer of claim 14, wherein said slider and said lug are disposed within a pocket inside said display unit bounded by said front side and said back side and said edge side and a connecting surface opposite said edge side, and a first side connecting said connecting surface to said edge side and a second side opposite to said first side connecting said connecting surface to said edge side.

19. The portable computer of claim 14, wherein said back side of said display panel is absent a hole.

20. The portable computer of claim 14, wherein said bottom surface of said base is absent a hole.

21. A portable computer, comprising:
  a base having a seat formed on a first face;
  a display panel having a front and a second face and covering said first face;
  a lug capable of coupling to said seat; and
  a locking mechanism installed in said display panel, retaining said display panel securely against said base by means of said lug, said locking mechanism comprising:
    a pocket installed in said display panel, having two sides extending from said second face and a surface connecting said two sides;
    a slider located in said pocket to move with straight-line motion between said two sides of said pocket and having said lug inserted completely into an inside of said pocket when said display panel is not covering said first face of said base; and
    a knob coupled to said slider, for protruding said lug toward said front of said display panel by operation of said slider, so that said locking mechanism inserts said lug into said display panel, said locking mechanism being absent any additional lugs.

22. The portable computer of claim 21, said locking mechanism further comprises:
  a first protrusion formed in said slider; and
  a groove formed in said lug, coupled to said first protrusion when said lug is protruded from said slider, so that said lug is not optionally revolved when said lug is protruded from said slider.

23. The portable computer of claim 21, further comprised of said slider having an opening formed toward said front of said display panel, said knob is coupled to said slider across said opening, and one end of said lug is inserted into said opening to be revolvably coupled to said knob.

24. The portable computer of claim 1, with said locking mechanism further comprising:
  a stopper formed on a bottom surface of said pocket to be located toward motion of said slider and in front of said lug; and
  a second protrusion formed under said lug and hooked on said stopper when said slider is moved by said knob, for ejecting said lug from said slider by revolving said lug to said slider.

* * * * *